| United States Patent | [11] 3,612,439 |

| [72] | Inventor | Philip John Wingham |
| | | Bath Bai, England |
| [21] | Appl. No. | 820,885 |
| [22] | Filed | May 1, 1969 |
| [45] | Patented | Oct. 12, 1971 |
| [73] | Assignee | Avimo Limited |
| | | Taunton, Somerset, England |
| [32] | Priority | May 2, 1968 |
| [33] | | Great Britain |
| [31] | | 20800/1968 |

[54] STATIC VENTS FOR AIRCRAFT
2 Claims, 6 Drawing Figs.

[52] U.S. Cl. .................................................. 244/1 R,
73/384, 73/388 R
[51] Int. Cl. ................................................ B64d 43/02
[50] Field of Search ........................................ 244/1, 77,
117, 129, 130; 73/182, 384, 388, 212

[56] References Cited
UNITED STATES PATENTS
3,262,316  7/1966  Hansen et al. ................  73/388

Primary Examiner—Milton Buchler
Assistant Examiner—Jeffrey L. Forman
Attorney—Holman & Stern ABSTRACT: Certain aircraft instruments are dependent on static pressure readings derived from a static vent. It is necessary for accuracy that the reading at the static vent shall be independent of airspeed. In order to enable this to be achieved there is provided an aircraft or part thereof including a static vent, the smooth aerodynamic shape of the aircraft or part being modified locally in the region of the vent to modify the airflow thereover in operation so as substantially to compensate the position error arising from variation in Mach number.

PATENTED OCT 12 1971
3,612,439
FIG.1.
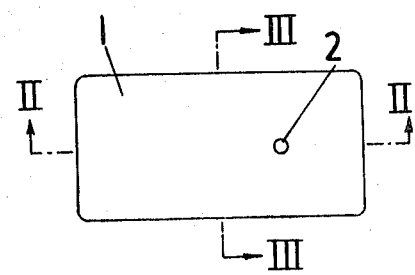
FIG.3.
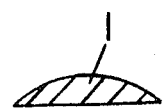
FIG.2.
FIG.4.
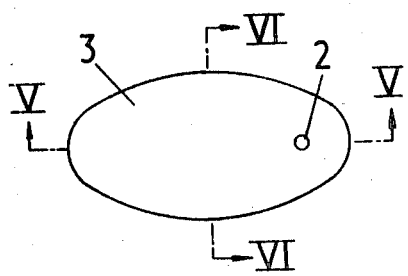
FIG.6.
FIG.5.
INVENTOR
PHILIP JOHN WINGHAM
BY Holman, Glascock,
Downing & Seebold
ATTORNEYS

STATIC VENTS FOR AIRCRAFT

This invention relates to static vents for aircraft.

The altimeter, the airspeed indicator and the machmeter of an aircraft provide their indications by derivation from two pressures which are sensed at different points on the aircraft. These are termed the "pitot" and "static" pressures. The former is usually sensed at the open end of a forward facing tube, called a pitot tube or pressure head, and the latter is sensed either at orifices in the sidewalls of the pressure head or at an orifice flush with the surface or skin of the aircraft at a chosen point. This orifice in the surface is often called the "static vent." In practice there may be more than one static vent to allow for the effects of asymmetric flight such as occurs in sideslipping, or to provide additional sensing points.

The magnitude of the airspeed and the Mach number of the aircraft are derived from a combination of the pitot and the static pressure and the altitude is derived solely from the static pressure measurement.

In order that the indicated values of airspeed and Mach number and altitude may be valid and accurate, it is necessary that the pressure sensed at the static vent shall be equal to the ambient pressure of the air through which the aircraft is flying.

The position chosen for the static vent must therefore be a point on the aircraft where the local pressure does not vary with the speed of the aircraft but only with its altitude.

If the aircraft operates with a maximum Mach number of about 0.4, it is normally possible to find a suitable position on the aircraft for a static vent to meet this requirement. This is usually on the forward part of the fuselage ahead of the mainplane. However, if the aircraft operates over a large Mach number range extending to supersonic values, it is not normally possible to find a single point on the surface where the local pressure is unaffected by the airspeed of the aircraft over the whole speed range. This is because the flow pattern over the aircraft changes its character when the Mach number changes.

Thus, in practice, for these high-performance aircraft the local pressure sensed at the chosen static vent position is in error by a small but significant amount. For example, at a point on the forward part of the fuselage of an aircraft the static vent may indicate too low a pressure at subsonic Mach numbers and too high a pressure at supersonic Mach numbers. This error, often called "position error," prevents the aircraft instruments from giving a true indication of airspeed, Mach number and altitude. Furthermore the pilot and crew must have knowledge of the magnitude and sign of the position error, at each Mach number and altitude, so that they may correct the readings indicated by the aforesaid instruments.

It is an object of the invention to provide a form of static vent with a built in compensation for "position error," so that the local pressure sensed at the static vent will be effectively equal to the true ambient pressure over a wide range of operating requirements.

The invention accordingly consists in an aircraft or part thereof including a static vent, the smooth aerodynamic shape of the aircraft or part being modified locally in the region of the vent to modify the air flow thereover in operation so as substantially to compensate the position error arising from variation in Mach number.

Such a vent in a localized modification will be hereafter referred to as a compensated vent.

If the errors indicated by an uncompensated static vent are known at each Mach number, then a limited local modification to the aircraft surface can be designed to compensate for the error at each Mach number. For example, if the pressure error sensed by the uncompensated vent is a certain underpressure at a specified subsonic Mach number and an overpressure at a specified supersonic Mach number, the modification will be designed to create an overpressure of equal magnitude at subsonic Mach number and an underpressure of the necessary magnitude at supersonic Mach number, thus nullifying the original errors.

Furthermore, the manner in which the error varies with Mach number can be matched by the compensating pressures.

In addition to achieving this compensation it is preferable to minimize any interference with the local structure of the aircraft in the region of the static vent and to avoid disturbing the local airflow over the vent region in a manner that would adversely affect the flow over other parts of the aircraft and cause, for example, a significant increase in the drag of the aircraft.

The modification of the surface is preferably obtained by means of a shallow bulge or bump, including an aperture to act as the static vent, adapted to be manufactured separately and attached to the surface of the aircraft or part at the appropriate location.

The exact form and shape of the bulge will be chosen to compensate for the pressure errors known to exist at each Mach number at the chosen location of the static vent in the uncompensated form.

The invention will be further described with reference to the accompanying diagrammatic drawings wherein preferred forms of bulges or bumps for attachment to an aircraft.

In the drawings:

FIG. 1 is a diagrammatic plan view of a bulge or bump according to a first preferred form of the invention;

FIGS. 2 and 3 are sections on the lines II—II and III—III of FIG. 1 respectively;

FIG. 4 is a diagrammatic plan view of a modified form of bulge or bump constituting a second preferred form of the invention; and FIGS. 5 and 6 are sections on the lines V—V and VI—VI of FIG. 4.

FIGS. 1 to 3 show a rectangular form of bulge or bump 1 with an orifice 2 acting as a static vent.

FIGS. 4 to 6 show a generally elliptical form of bulge or bump 3 with an orifice 2.

These forms have in common the following features.

1. They are thick enough to be rigid and self-supporting in isolation.
2. The thickness at their edges is reduced to allow the air to flow over them with a minimum of additional disturbance, and to create the necessary overpressures that may be required at subsonic Mach numbers.

The possible variations in shape, within these limitations, are such as to produce at a chosen single pressure tapping point any desired variation of compensation, for example, from underpressure to overpressure, or from overpressure to underpressure as the Mach number changes from subsonic to supersonic.

For example, a single tapping located on the downstream side of the bump could produce the pressure changes described in the first example in the above paragraph. Alternatively, to meet the opposite requirement for a different aircraft or a different uncompensated static vent position, the pressure tapping may be located on the upstream side of the bump.

The shape of the exposed surface of the bulge will determine the amount of compensation. The shape of the undersurface will be of a form that suits the aircraft to which it is attached.

The position of the tapping will vary according to the correction required either (a) from underpressure at subsonic speeds and overpressure at supersonic speeds, or (b) from overpressure at subsonic speeds and underpressure at supersonic speeds.

Other forms of variation of pressure error may be compensated for by suitable variation of the shape of the profile of the bump and the choice of the position of the pressure tapping.

Various modifications may be made within the scope of the invention.

I claim:

1. In an aircraft or part thereof having a surface of generally smooth aerodynamic shape and a static vent located therein, the shape being locally modified in the region of the static vent by a separable shallow bulge fixed on the exterior of said surface, the improvement wherein the bulge is fixed in shape and has a thickness which decreases smoothly from a central region to the edges, where it is substantially flush with said surface, whereby position error arising from variation in Mach number is compensated.

2. An aircraft or part thereof as claimed in claim 1, in which the static vent is formed by an aperture in the bulge.